United States Patent [19]

MacGuire

[11] 4,024,846

[45] May 24, 1977

[54] VALVE DEVICE AND SYSTEM EMPLOYING THE SAME

[75] Inventor: Andrew E. MacGuire, Willowdale, Canada

[73] Assignee: The Ferry Cap & Set Screw Company, Cleveland, Ohio

[22] Filed: Nov. 1, 1974

[21] Appl. No.: 519,863

[52] U.S. Cl. .................. 123/119 D; 123/119 B; 123/141

[51] Int. Cl.$^2$ ................ F02M 25/06; F02M 23/08

[58] Field of Search ....... 123/119 D, 119 B, 124 R, 123/97 B, 119 E, 141

[56] References Cited

UNITED STATES PATENTS

| | | | |
|---|---|---|---|
| 3,166,061 | 1/1965 | Weisel | 123/119 D |
| 3,463,132 | 8/1969 | Krieck | 123/119 D |
| 3,664,368 | 5/1972 | Sweeny | 123/119 D |
| 3,693,650 | 9/1972 | MacGuire | 123/119 D X |
| 3,768,789 | 10/1973 | August | 123/119 D |
| 3,799,132 | 3/1974 | MacGuire | 123/119 D |
| 3,809,035 | 5/1974 | Winton | 123/119 D X |
| 3,810,454 | 5/1974 | Hunt | 123/119 D X |

Primary Examiner—C. J. Husar
Assistant Examiner—Ira S. Lazarus
Attorney, Agent, or Firm—Donnelly, Maky, Renner & Otto

[57] ABSTRACT

Valve device and system employing same for providing variations in air flow to the manifold of an internal combustion engine in accordance with the engine vacuum. The valve device includes a plurality of resiliently deformable spherical members which are caused to resonate over substantially the full operating range of the engine, whereby the auxiliary air passing through the valve pulsates creating turbulence in the air flow into the manifold resulting in shock waves which assist in breaking up the fuel into smaller, more uniform particle sizes and maintaining a more constant air/fuel mixture over the full operating range. The valve body is in the shape of a Tee having a hollow-cylindrical portion containing the spherical members and oppositely extending tubular arms in communication therewith. One of the arms is plugged, and the other arm is connected to the carburetor by a hard plastic or metal tube which assists in maintaining the air pulsations during passage of the air therethrough. The PCV line extends from the crankcase in communication with the tube, whereby the pulsating air from the valve device imparts pulsations to the air passing through the PCV line thus to maximize the turbulence of air flowing into the carburetor.

20 Claims, 3 Drawing Figures

VALVE DEVICE AND SYSTEM EMPLOYING THE SAME

CROSS-REFERENCE TO RELATED PATENTS

This application relates to certain improvements in valve devices and systems employing the same of the type shown and described in U.S. Pat. Nos. 3,693,650 and 3,799,132, granted Sept. 26, 1972, and Mar. 26, 1974, respectively.

BACKGROUND OF THE INVENTION

The modern automotive internal combustion engine has been recoginzed as a principal contributor to atmospheric pollution, and a number of different approaches have been made to the problem. Devices of various sorts have been developed to control release of crankcase emissions and others have been developed to remove harmful products from the exhaust gases. It has, however, been recognized that the basic problem would be much ameliorated if the engines could be operated under substantially ideal conditions so that only small amounts of the objectionable pollutants would be produced, as by insuring substantially complete combustion of the engine fuel under all operating conditions. Examples of devices for such purpose are illustrated and described in Mokrzycki U.S. Pat. No. 3,039,449 and Canadian Pat. No. 590,030, as well as in Thomasson U.S. Pat. No. 1,259,317. While illustrating this general approach to the problem, such devices have not been flexible enough in operation quickly to accommodate rapid changes in engine operating conditions, such a rapid acceleration and rapid deceleration, to insure a proper air/fuel ratio at all times and thereby achieve substantially complete combustion of the fuel.

Substantially improved results have been obtained with the valves and air supply systems of the aforementioned MacGuire U.S. Pat. Nos. 3,693,650 and 3,799,132 which supply primary air to the engine manifold of an internal combustion engine over substantially the entire speed range of the engine for improved engine response and acceleration. Such valves and systems insure automatic adjustment to various throttle settings and rates of acceleration or deceleration, which in the past have commonly resulted in a temporary improper fuel/air mixture, and prevent the emission of excessive pollutants to the atmosphere, particularly carbon monoxide and hydrocarbon vapors.

It has been found, however, that improved performance of such valve and air supply systems can be obtained by proper adjustment of the valves to cause the valves to resonate over the full operating range of the engine, that is, during idle as well as during cruising and acceleration and deceleration. As the valves resonate, air pulsations are created causing turbulence in the air flow through the valves and into the carburetor where pressure waves are set up in the lower part of the carburetor and manifold which assist in breaking up the fuel into smaller, more uniform particle sizes in addition to maintaining a more constant air/fuel mixture over the full operating range, for improved combustion efficiency, fuel economy, and lower exhaust emissions.

It has also been found that making the valve housings with a right angle turn in the outlet or in the shape of a Tee and plugging one of the arms of the Tee has a beneficial effect in causing the valve to resonate. Also, utilizing a hard plastic such as hard nylon or metal tubing for the delivery line from the valves to the carburetor causes the delivery line to resonate and thus assist in maintaining the air pulsations during passage through the delivery line just prior to entering the carburetor. The pulsating air from the valves may also effectively be mixed with the air from the positive crankcase ventilation line prior to entering the carburetor to impart pulsations to the air passing through the PCV line as well to maximize the amount of pulsating air flowing into the carburetor.

The plastic balls for the valves are desirably pressure molded for more uniform and consistent results, and are preferably made of a suitable thermosetting material rather than a thermoplastic so as to withstand greater temperature variations without adversely affecting the capabilities of the balls to resonate. Using an O-ring or a suitable non-hardening sealer around the threads of the valve casings or both to prevent air from entering the valves except through the normal valve inlets also provides for better resonance.

With the foregoing in mind, it is a principal object of this invention to provide a valve and supplemental air supply system to the manifold of an internal combustion engine which produces air pulsations causing turbulence in the air flow through the valve and into the carburetor to assist in obtaining smaller, more uniform fuel particle sizes and maintaining a more constant air/fuel mixture over the full operating range of the internal combustion engine.

Another object is to provide a method by which such valve and system may be adjusted for maximizing such air pulsations.

Still another object is to provide such a valve and system in parallel with the positive crankcase ventilation line so that the pulsating air form the valve also imparts pulsations to the air passing through the PCV line to maximize the turbulence of the air flow entering the carburetor.

Another object is to provide such a valve and system which will obtain more uniform and consistent results over a greater temperature range resulting in greater combustion efficiency and fuel economy, and reduced exhaust emissions.

DESCRIPTION OF THE PREFERRED EMBODIMENT

Figure 1:
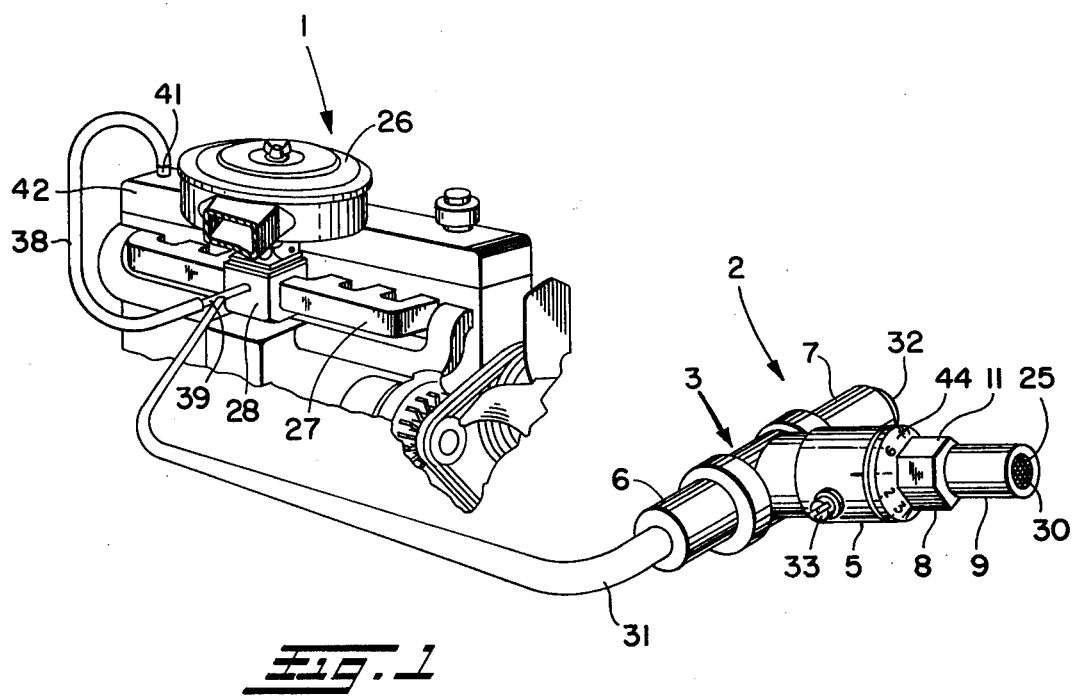
FIG. 1 is a schematic diagram showing a preferred form of valve and supplemental air supply system in accordance with this invention connected to an internal combustion engine.
Figure 2:
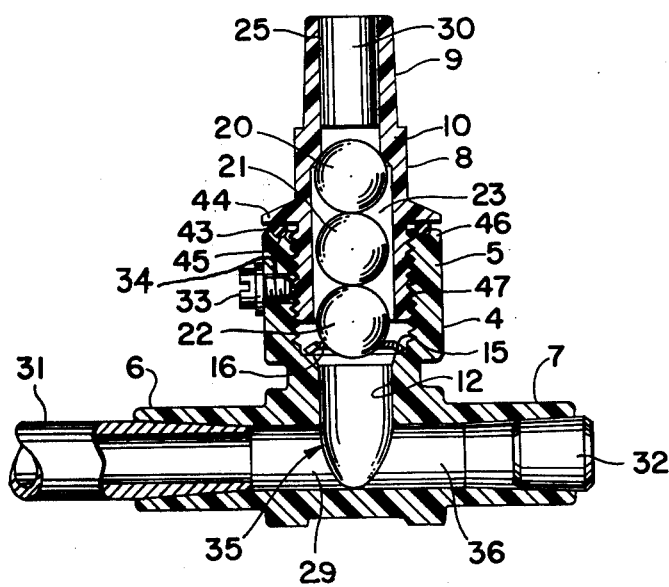
FIG. 2 is an enlarged longitudinal section through the valve of FIG. 1.

Referring now in detail to the drawings and initially to FIG. 1, there is shown by way of illustration a conventional automotive internal combustion engine 1 and a preferred form of supplemental air supply system 2, including a valve 3, connected thereto. The valve 3 desirably substantially conforms to the valve illustrated in FIG. 3 of the aforementioned MacGuire U.S. Pat. Nos. 3,693,650 and 3,799,132, incorporated herein by reference. Thus, as shown in FIG. 2 herein, the valve 3 desirably consists of a unitary Tee-shape plastic body 4 having a hollow cylindrical portion 5 in communication with oppositely extending tubular arms 6, 7. Threadedly adjustably received within such cylindrical body portion is a tubular casing 8 having an integral extension 9 of slightly reduced inner diameter than the inner diameter of the casing proper, thereby providing a beveled shoulder 10 therebetween. Such casing 8 may have an outer hexagonal or octagonal configuration 11 (see FIG. 1) to facilitate application of a wrench thereto for rotating the casing relative to the body and thereby axially shift the casing relative to the body.

Figure 3:
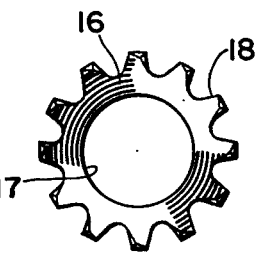
FIG. 3 is an enlarged detailed view of the support means for the valve members.

The diameter of the opening 12 leading to the interior of the body portion 5 to communicate with the arms 6, 7 of the Tee is of smaller diameter than the inner diameter of such body portion, thereby providing a shoulder 15 for supporting a frustoconical serrated washer 16 which may have a circular central opening 17 and a number of outer peripheral notches 18 as shown in FIG. 3.

Received within the casing 8 are three spheres or balls 20, 21, 22 of a diameter greater than the internal diameter of the extension 9 and greater than the diameter of the central opening 17 of the washer 16. Such balls are also of somewhat smaller diameter than the internal diameter of the casing 8 to provide a clearance therebetween for a purpose to be subsequently described. By turning the casing as above-described, the shoulder 10 (which serves as a valve seat) may be moved toward and away from the washer 16 to vary the length of the chamber 23 containing such balls 20, 21, 22 and to subject the latter to a predetermined degree of compression.

As shown in FIG. 1 of the aforementioned MacGuire patents, the valve inlet 25 may be connected by suitable tubing with the underside of a conventional air filter 26 on the automotive internal combustion engine 1, and the two arms 6, 7 of the valve 3 may be connected to the engine manifold 27 with which the conventional carburetor 28 is also in communication by additional tubing. Alternatively, the tubing between the air filter 26 and valve 3 may be eliminated and a suitable filter 30 may be conveniently mounted within the inlet opening 25 of the valve as clearly illustrated in FIGS. 1 and 2 of the present application to permit fresh air to pass directly into the valve. Moreover, instead of providing delivery lines from both of the valve arms 6, 7, a single delivery line 31 desirably runs from one of the arms 6 directly to the lower portion of the carburetor 28, and the other arm 7 is plugged at 32, for a purpose to be subsequently described.

The valve 3 of the present invention is preferably installed with the casing 8 extending in a substantially horizontal direction, but this is not essential and the device will operate regardless of position. The valve body and casing are also desirably made of a suitable plastic material such as nylon which will not deteriorate under warm operating conditions in the presence of oil and gasoline fumes. The valve 3 must of course be mounted adjacent the engine, but should be located in a position where it will not be subjected to excessive heat, for example, on the front bulkhead or in another cool section of the engine compartment.

The balls 20, 21, 22 are desirably pressure molded rather than injection molded for more uniform and consistent results, providing better roundness of the balls and eliminating the need for having to remove any sprues or flashing from the balls. A suitable thermosetting polyurethane material is also desirably used for the balls rather than a thermoplastic material because of its ability to withstand greater temperature ranges without adversely affecting the operation of the balls which are desirably resiliently deformable and capable of bulging laterally within the casing when the balls are unseated due to changes in pressure. The flexing of the balls also assists in preventing build-up of carbon and other like deposits within the device.

Initially, the casing 8 may be rotated relative to the body portion 4 of the valve so as just barely to seat the valve member 20 against the shoulder 10. After the engine 1 has been started, the casing 8 may then be very slightly rotated until the smoothest possible idle is obtained and the elastomeric balls 20, 21, 22 are vibrating at resonance. Unless the carburetor is badly out of adjustment (e.g. affording a very high idle) it will ordinarily not be necessary to make any adjustment to the carburetor. However, for best results, the engine should be tuned to minimize its emissions before the valve 3 is properly adjusted to obtain maximum beneficial results.

The valve 3 should normally be set while the engine is idling at about 16 or 17 inches of vacuum or the engine is running at about 1500 to 2000 rpms. To set the valve for engines of 1972 cars or older, the casing 8 should be opened slightly until air can be heard rushing through the device and then slowly closed to cause the balls to buzz and resonate. When the balls reach their highest frequency, the casing 8 should be locked in place as by tightening the set screw 33 which is threadedly received in an opening 34 in the valve body 4 and engageable with the outer surface of the casing 8. For 1973 and '74 cars, the carburetors are factory set quite lean, which causes the engines to idle quite rough, and therefore instead of setting the valves by sound, such valves are more effectively set using an air flow meter to measure the air flow through the valves during engine idle. For '73 cars, the casing 8 is desirably screwed down until the air flow through the valve measures 70 to 90 cubic feet per hour, whereas for '74 cars, the air flow through the valve should be adjusted to 50 to 70 cubic feet per hour. In either case, the setting will be such that the balls will continue to resonate as before.

As the balls resonate, they create shock waves in the air stream passing into the manifold. The injection of additional pulsating air into the carburetor and manifold increases the turbulence of the fuel/air mixture and thoroughly mixes the required amount of air with the fuel at the critical point within the engine for improved combustion and fast response at substantially all engine speeds. The outer peripheral notches 18 in the washer 16 also create a swirling action of the air passing through the valve device, whereby the air enters the carburetor and manifold in sonic waves combined with a swirling motion for increased turbulence.

By proper adjustment of the valve 3, the balls 20, 21, 22 can be made to resonate over the full operating range of the engine, that is, during idle as well as during cruising and acceleration and deceleration. In actual practice, it has been found that the balls will resonate from about 5 inches of vacuum to about 25 inches of vacuum, with best resonation between 13 inches and 19 inches of vacuum. This creates air pulsations causing turbulence in the air flow which may be introduced directly into the carburetor 28 through the delivery line 31 where pressure waves are set up in the lower part of the carburetor and manifold to help break up the fuel into smaller more uniform particle sizes and maintain a more constant air/fuel mixture over the full operating range.

It has also been found that making the plastic body 4 with a right angle turn in the valve outlet 29 which may also be in the shape of a Tee and plugging one of the arms 7 with a suitable plug 32 but not the other assists in causing the balls 20, 21, 22 to resonate over a greater range because of the right angle turn at 35 and the oppositely extending swirl chamber 36. Moreover, if the delivery line 31 from the valve 3 to the carburetor 28 is made of a hard plastic such as nylon or metal tubing, the resonation of the balls will be transmitted to the delivery line causing the delivery line also to resonate and thereby assist in maintaining the air pulsations during passage through the delivery line just prior to entering into the carburetor for increased turbulence.

The pulsating air from the valve 3 may also be effectively mixed with the air from the positive crankcase ventilation line 38 prior to entering the carburetor 28, as by providing a Y connection 39 on the valve delivery line 31 and connecting the PCV line to the Y connection as further illustrated in FIG. 1. The result is that the pulsating air from the valve 3 also imparts pulsations to the air passing through the PCV line thus to maximize the turbulence of the air flow entering the carburetor in the manner previously described.

Improved resonance of the balls 20, 21, 22 will also result if an 0-ring seal 43 is interposed between an annular flange 44 on the tubular casing 8 and the adjacent end of the plastic body to prevent air from entering the valve 4 except through the normal inlet opening 25. An annular groove 45 may be provide in the plastic body end portion 46 for receipt of the 0-ring seal 43 as shown, and a suitable non-hardening sealer 47 may also be placed around the threads of the casing to further assist in making the connection between the tubular casing 8 and plastic body portion 4 airtight. Also, as previously indicated, making the balls out of a thermoset material rather than thermoplastic permits the balls to withstand greater temperature ranges without adversely affecting the resonating characteristics of the balls.

The amount of supplemental air which is admitted to the carburetor through the valve 3 is of course influenced by the manifold vacuum (normally about 16 to 17 inches of mercury at idle) which serves to unseat the ball valve 20 with consequent compression of the balls 20, 21, 22 axially of the casing 8 and corresponding lateral bulging of the balls 20, 21, 22 toward the wall of the valve chamber 23 within the casing. As previously disclosed in the aforementioned MacGuire U.S. Pat. Nos. 3,693,650 and 3,799,132, if the ball 20 is thus unseated and moved axially within the chamber 23 for a considerable distance under the influence of very high vacuum in the line, the balls 20, 21, 22 would be thus laterally bulged to such an extent as to very substantially restrict the passage between the same and the chamber wall. This imposition of a momentary but nevertheless very high vacuum accordingly is ineffective to draw as much air through the valve assembly 3 as would otherwise be the case.

Automotive engine carburetors are ordinarily most efficient when the vehicle is operating at a speed of approximately 50 to 60 mph, providing too rich a mixture at idle. By admitting supplementary air to the manifold, the system of this invention has the effect of providing a smoother idle as well as insuring substantially complete combustion of the fuel to minimize discharge of carbon monoxide and unburned hydrocarbon.

As the engine is accelerated gradually the vacuum may drop to about 14 inches of mercury and only a litle more additional air is admitted to the carburetor through the valve than in the case when the engine is at idle. If the engine is now accelerated to about 50 mph, for example, the vacuum may drop to about 2 to 3 inches of mercury and very little supplemental air will pass through the valve to the carburetor.

When the engine is abruptly decelerated, the vacuum may build up to approximately 25 inches of mercury, which would be expected to draw too much air through the valve device with consequent unstable engine operation. The valve device, however, automatically eliminates such problem due to the lateral expansion of the balls which limits the passage for the air through the chamber, and consequently the increase in air flow to the manifold is not nearly as substantial as would be expected from the abrupt increase in manifold vacuum. The balls 21, 22 which support the ball valve member 20 and resiliently bias the latter toward valve closing position tend thus to be laterally deformed to a greater extent than the ball valve member 20 itself. This may, however, be regulated as desired by employment of balls of varying degrees of resilience.

As is well known, the PCV valve 41 performs two very important functions. First of all, it provides an effective means of removing harmful vapors from the crankcase 42 that are created through blow-by, and secondly, such harmful vapors and pollutants are not discharged directly from the crankcase into the atmosphere, but rather are caused to flow back into the intake manifold 27 for reburning. The PCV valve 41 is a simple, spring-loaded valve that opens and closes according to manifold vacuum, and its principal function is to permit maximum flow of vapor as the engine speed and thus the vapor volume increases. However, it has been found that if the PCV valve 41 is connected in parallel with the valve 3 in the manner previously described, better engine performance results, presumably because the turbulence of the air flow entering the carburetor is maximized. On the other hand, if the PCV valve 41 is bad or defective (i.e. stuck or clogged), connecting it in parallel with the valve 3 may have an adverse effect on the operation of the valve 3, and therefore it is important to make certain the PCV valve is operative before making such a connection. The valve 3 will not adversely affect the operation of the PCV valve, primarily because at high vacuum demand, the valve 3 will tend to close off.

In a typical installation for the purpose described, the balls 20, 21, 22 may be ½ inch in diameter and the inner diameter of the chamber 23 in the casing 8 may be only several hundredths of an inch greater. Despite the tendency of such balls to bulge laterally as the valve 20 opens more and more, such bulging will not ordinarily be to an extent sufficient entirely to close off the passage for fluid flow through the chamber, there being an automatic self-compensating effect whereby the force tending to open the valve is diminished gradually as such passage becomes more and more restricted. Pressure molding the balls also enhances their roundness and eliminates flashings or sprues on the balls for more uniform and consistent results.

The density of the balls and particularly the last ball 22 will also influence the resonating characteristics of the balls to a great extent. If, for example, the last ball 22 which is resting against the star washer 16 is softer, the device will resonate at lower air flow. However, using too soft or resilient balls may restrict the range of frequency over which the balls will resonate, and very soft or resilient balls also become too spongy and their resilience is no longer of any value.

The valve assembly 3 should desirably be fully insulated from the engine and other metal parts to avoid stripping of negative charges from the air delivered to the engine, and where a metal air delivery line 31 is used, rubber or other insulating coating may be used to insulate the delivery line from the engine where it is connected to the carburetor. It has also been found advantageous to locate the valve assembly and the air intake therefor out on the front bulkhead or in a cool section of the engine compartment to minimize the loss of electrons due to heat.

The construction of the valve assembly 3 is such that its operation is not affected by engine or road vibration. The assembly is light in weight, inexpensive, and easily installed and provides a degree of protection against the dangers of a faulty exhaust system since discharge of lethal carbon monoxide may be much diminished thereby.

The device also permits adjustment of the carburetor to provide a richer air/fuel mixture so that the engine will run better, while still obtaining the desired atomizing effect and maintaining the desired fuel/air mixture over substantially the entire operating range of the engine which has a beneficial effect on combustion efficiency, fuel economy, and exhaust emissions. The air pulsations created by the valve have the desirable effect of atomizing the fuel, and also help to more fully disperse and spread out the fuel which creates more uniformity in fuel/air mixture.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. In combination with an internal combustion engine having an intake manifold and carburetor, pressure responsive valve means for supplying auxiliary air to said manifold, said valve means comprising a valve chamber having an inlet and an outlet, a plurality of resiliently deformable spherical members within said chamber intermediate said inlet and outlet, said spherical members being positioned within said valve member to resonate over substantially the full operating range of said engine to cause the auxiliary air passing therethrough to pulsate creating turbulence in the air flow entering said manifold resulting in shock waves which assist in breaking up the fuel into smaller, more uniform particle sizes and maintaining a more constant air/fuel mixture over such operating range.

2. The combination of claim 1 wherein said chamber comprises two cylindrical portions threadedly axially connected together for relative rotation to vary the longitudinal extent of said chamber, the relative axial positions of said cylindrical portions being adjusted to cause said spherical members to resonate at their highest frequency while said engine is idling.

3. The combination of claim 2 further comprising a set screw threadedly received in an opening in one of said cylindrical portions and engageable with the other of said cylindrical portions for locking said cylindrical portions in place.

4. The combination of claim 1 wherein said valve means includes a body member in the shape of a Tee having a hollow cylindrical portion containing said chamber and oppositely extending tubular arms in communication with said outlet from said chamber, and a delivery line providing communication between one of said arms and said carburetor, the other of said arms being plugged.

5. The combination of claim 4 wherein said delivery line is made of a hard plastic such as nylon which assists in maintaining the air pulsations during passage therethrough to said carburetor.

6. The combination of claim 4 wherein said delivery line is made of metal which assists in maintaining the air pulsations during passage therethrough to said carburetor.

7. The combination of claim 2 further comprising a non-hardening sealer between the threads of said cylindrical portions to prevent air from entering said chamber except through said inlet.

8. The combination of claim 1 wherein said spherical members are made out of a thermoset material which will withstand greater temperature ranges without adversely affecting the resonating characteristics of said spherical members.

9. The combination of claim 8 wherein said spherical members are pressure molded for more uniform and consistent results.

10. The combination of claim 1 wherein said inlet to said chamber is exposed directly to the atmosphere and contains a filter for removing dirt particles from the entering air.

11. The combination of claim 1 further comprising an air delivery line providing communication between said outlet and said carburetor, said engine having a PCV line extending from the crankcase in communication with said air delivery line, whereby the pulsating air from said valve means imparts pulsations to the air passing through said PCV line thus to maximize the turbulence of air flow entering said carburetor.

12. The combination of claim 11 wherein said air delivery line is made of metal and includes a Y connection adjacent said carburetor for connection of said PCV line thereto.

13. The combination of claim 12 wherein the connection between said delivery line and carburetor is insulated.

14. The combination of claim 1 further comprising a serrated washer contained within said chamber axially spaced from said inlet, said inlet being open to the atmosphere, and an air delivery line communicating said outlet with said manifold.

15. The combination of claim 1 wherein there are three of said spherical members contained in said chamber.

16. The combination of claim 15 wherein said resiliently deformable spherical members are deformable by fluid pressure to cause lateral bulging of said spherical members toward the surrounding wall of said chamber to reduce the clearance between said spherical members and wall and thereby increasingly restrict the flow of fluid around said spherical members as the fluid pressure increases, said chamber being dimensioned to afford a small amount of clearance for said spherical members even when the latter is compressed axially of said chamber by fluid pressure as aforesaid.

17. The combination of claim 2 wherein said cylindrical portions have opposing surfaces, and an O-ring seal is interposed between said opposing surfaces.

18. The combination of claim 17 wherein said O-ring seal is interposed between an annular flange on one of said cylinder portions and the adjacent end of said other cylinder portion, said adjacent end of said other cylinder portion having an annular groove therein for receipt of said O-ring seal.

19. The combination of claim 1 wherein said outlet includes a right angle turn.

20. In combination with an internal combustion engine having an intake manifold and carburetor, pressure responsive valve means for supplying auxiliary air to said manifold, said valve means comprising a valve chamber having an inlet and an outlet, a plurality of resiliently deformable spherical members within said chamber intermediate said inlet and outlet, and means for causing said spherical members to resonate over substantially the full operating range of said engine to cause the auxiliary air passing therethrough to pulsate creating turbulence in the air flow entering said manifold resulting in shock waves which assist in breaking up the fuel into smaller, more uniform particle sizes and maintaining a more constant air/fuel mixture over such operating range, said valve means including a body member in the shape of a Tee having a hollow cylindrical portion containing said chamber and oppositely extending tubular arms in communication with said outlet from said chamber, and a delivery line providing communication between one of said arms and said carburetor, the other of said arms being plugged at its outermost end, said other arm forward of said plug providing a swirl chamber for the air passing through said outlet.

* * * * *